(No Model.)
C. DORN & E. NOPPEL.
APPARATUS FOR PURIFYING AND REFINING OIL.
No. 411,646. Patented Sept. 24, 1889.
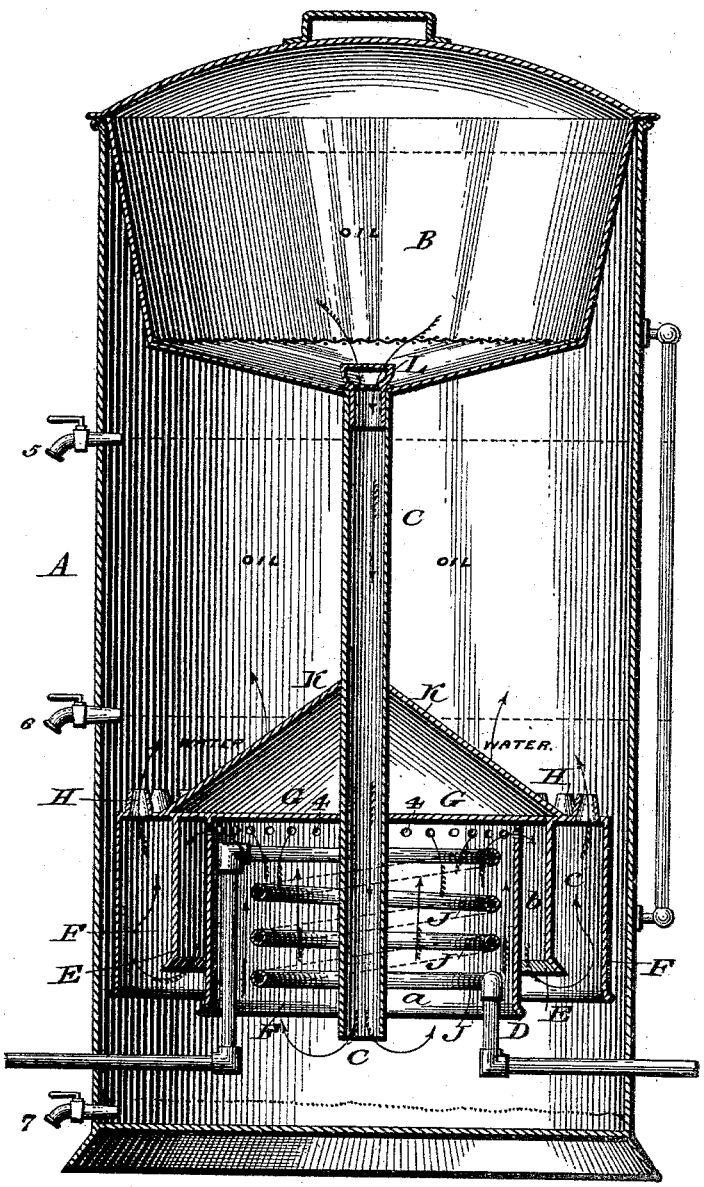

UNITED STATES PATENT OFFICE.

CHRISTIAN DORN AND EMIL NOPPEL, OF PHILADELPHIA, PENNSYLVANIA.

APPARATUS FOR PURIFYING AND REFINING OIL.

SPECIFICATION forming part of Letters Patent No. 411,646, dated September 24, 1889.

Application filed May 2, 1889. Serial No. 309,334. (No model.)

*To all whom it may concern:*

Be it known that we, CHRISTIAN DORN and EMIL NOPPEL, citizens of the United States, residing in the city and county of Philadelphia, State of Pennsylvania, have invented a new and useful Improvement in Apparatus for Purifying or Refining Oil, which improvement is fully set forth in the following specification and accompanying drawing.

Our invention consists of an apparatus for purifying or refining oil, embodying means for directing the oil through a fluid in different chambers, whereby it is purified or refined.

It also consists of means for heating the oil, so that the impurities are more readily liberated and permitted to precipitate.

It also consists of additional means for causing any existing impurities in the oil that has been treated to be directed to the bottom of the tank.

The figure represents a vertical section of an apparatus for purifying or refining oil embodying our invention.

Referring to the drawing, A designates a tank, within which, at the upper end, is suspended a funnel or reservoir B, the discharge-pipe C of which reaches to nearly the bottom of the tank.

D, E, and F designate cylinders which depend from the horizontal plate G, forming three concentric chambers $a$ $b$ $c$, which surround the lower portion of the pipe C, each chamber being open at bottom and submerged in the purifying or refining fluid in said tank above the bottom of the latter. The cylinder D is provided with openings 4 at its upper end, whereby communication is had between the chambers $a$ and $b$. The rim of the plate G is provided with nozzles H, which open into the tank above said plate. The cylinder E is preferably shorter than either of the cylinders D or F, so that the oil as it escapes or leaves the chamber $b$ will more certainly enter the chamber $c$, and thus be prevented from passing between the cylinder F and the wall of the tank. Within the chamber $a$ is a steam-pipe J, of the form of a coil or other suitable shape, the inlet and outlet ends of said pipe passing through the walls of the tank. The tank is provided with cocks 5, 6, and 7 at different levels for removal of purified or refined oil, water, and sediment. Supported above the plate G is a deflector K, which is secured to said plate G or the pipe C, or both, and is of conical form and has its base below the top of the nozzles H.

The funnel or reservoir B is provided with a strainer L at or near the discharge-pipe.

The operation is as follows: The tank is supplied with water or other fluid suitable for purifying or refining oil, and the oil is placed in the funnel B, the top of the pipe C having a perforated plug L therein for preventing rapid escape of the oil. It will be seen that the oil descends in the pipe C and escapes at the bottom of the same. It then rises and fills the chamber $a$, after which it passes through the perforations 4 and reaches the chamber $b$, it escaping at the bottom of said chamber $b$ and entering the chamber $c$, from whence it is discharged at top into the tank through the nozzles H, it being noticed that the oil traverses the water or fluid in the several chambers, and also the water in the tank above the chambers, whereby it is purified or refined and is collected in the tank above the water-line. The impurities in the oil are liberated and escape at the bottom of the chambers to the bottom of the tank, where they may be removed through the cock 7. Should there be any impurities in the oil liberated after it leaves the nozzles H, they may be precipitated upon the deflector K and flow down the same and over the rim of the plate G, whereby they are directed to the bottom of the tank.

The steam-pipe J is within the chamber $a$, which is filled with oil, whereby the latter directly in contact with said pipe is heated and its density reduced, so that the impurities in the same are quickly liberated and precipitated.

Having thus described our invention, what we claim as new, and desire to secure by Letters Patent, is—

1. An apparatus for refining and purifying oil, consisting of a tank, a receiving-reservoir in the upper part of said tank and provided with a discharge-pipe extending to near the bottom of the tank, a horizontal plate surrounding said discharge-pipe in said tank, depending cylinders secured to said plate, forming chambers communicating at alternate ends, a heating-pipe within said chambers, said parts being combined substantially as described.

2. A tank with a reservoir therein, the latter having a discharge-pipe within the tank extending to near the bottom thereof, a horizontal plate with nozzles on its upper face and near its outer rim, depending concentric cylinders secured to said plate, forming communicating chambers, and heating-pipes within the inner one of said chambers, said parts being combined substantially as described.

3. An apparatus for refining and purifying oil, consisting of a tank having cocks at different heights thereon, a reservoir in the upper part of said tank having a discharge-pipe within the tank and extending to near the bottom thereof, a horizontal plate having nozzles near its rim, depending cylinders secured to said plate and forming chambers, said chambers having communication at alternate ends, a heating coil-pipe in the lower part of the tank and in the inner chamber, and a deflector on said horizontal plate, said parts being combined substantially as described.

4. In an apparatus for refining and purifying oil, a tank with suitable outlets, a reservoir with discharge-pipe in said tank, a horizontal plate with depending cylinders, forming communicating chambers, the outer one of said chambers having an upward outlet through openings in the horizontal plate, and a heating-pipe in said inner chamber, said parts being combined substantially as described.

CHRISTIAN DORN.
EMIL NOPPEL.

Witnesses:
JOHN A. WIEDERSHEIM,
L. JENNINGS.